US010333915B2

(12) United States Patent
Chhabra et al.

(10) Patent No.: US 10,333,915 B2
(45) Date of Patent: Jun. 25, 2019

(54) CUSTOMIZATION OF USER ACCOUNT AUTHENTICATION

(71) Applicant: Yahoo! Inc., Sunnyvale, CA (US)

(72) Inventors: Lovlesh Chhabra, San Ramon, CA (US); Manoj Bapuji Palki, Santa Clara, CA (US); Jonathan Hryn, Cary, NC (US); Atte Lahtiranta, Cupertino, CA (US)

(73) Assignee: Oath Inc., New York, NY (US)

( * ) Notice: Subject to any disclaimer, the term of this patent is extended or adjusted under 35 U.S.C. 154(b) by 44 days.

(21) Appl. No.: 14/967,016

(22) Filed: Dec. 11, 2015

(65) Prior Publication Data

US 2017/0171216 A1 Jun. 15, 2017

(51) Int. Cl.
*H04L 29/06* (2006.01)

(52) U.S. Cl.
CPC ............ *H04L 63/08* (2013.01); *H04L 63/205* (2013.01); *H04L 2463/082* (2013.01)

(58) Field of Classification Search
None
See application file for complete search history.

(56) References Cited

U.S. PATENT DOCUMENTS

2004/0206815 A1* 10/2004 Tarnovsky ........... G06K 7/0021
235/382
2006/0282882 A1* 12/2006 Bajko ................... H04L 9/0844
726/4
2009/0300744 A1* 12/2009 Guo .................... H04L 63/0823
726/7
2011/0004921 A1* 1/2011 Homer .................... G06F 21/31
726/3

OTHER PUBLICATIONS

Gordon, Whitson, "Here's everywhere you should enable two-factor authentication right now," Lifehacker, Dec. 10, 2013, downloaded from http://lifehacker.com/5938565/heres-everywhere-you-should-enable-two-factor-authentication-right-now?utm_expid=66866090-68.hhyw_1mCRuCTCg0I2RHHtw.0&utm_referrer=http%3A%2F%2Flifehacker.com%2F5938565%2Fheres-everywhere-you-should-enable-two-factor-authentication-right-now.

* cited by examiner

*Primary Examiner* — Joseph P Hirl
*Assistant Examiner* — Hassan Saadoun
(74) *Attorney, Agent, or Firm* — Weaver Austin Villeneuve & Sampson LLP (57) ABSTRACT

In one embodiment, a user identifier associated with a user account is received. Indications of a plurality of authentication mechanisms available for authentication are provided for display via the client device. Input indicating a number of authentication mechanisms to be used for authentication in association with the user account is received from the client device, wherein the input includes a selection of one or more of the plurality of authentication mechanisms. Information is stored in association with the user account, where the information indicates the number of authentication mechanisms to be used for authentication in association with the user account and indicates the selected authentication mechanisms. At least a subset of the selected authentication mechanisms are used for authentication in association with the user account.

26 Claims, 6 Drawing Sheets

CUSTOMIZATION OF USER ACCOUNT AUTHENTICATION

BACKGROUND

The disclosed embodiments relate generally to computer-implemented methods and apparatus for performing authentication in association with user accounts.

To gain access to resources of a computer system, an individual is often required to complete a login procedure. In some instances, the computer system may include a remote computer. Resources offered by a computer system may include, for example, data, applications, or various services offered by the computer system.

During the login process, the computer system typically identifies and authenticates an individual. Generally, authentication is performed using a password submitted by the individual. For example, a web site may provide a login page that enables the individual to submit a password to successfully log in to the web site.

A password is typically a word or string of characters used for user authentication to prove identity or access approval to gain access to a resource offered by a computer system. Generally, an individual selects the password that the computer system will use to authenticate the individual during subsequent login processes.

SUMMARY

In one embodiment, a user identifier associated with a user account is received from a client device. Indications of a plurality of authentication mechanisms available for authentication are provided for display via the client device. Input indicating a number of authentication mechanisms to be used for authentication in association with the user account is received from the client device, wherein the input includes a selection of one or more of the plurality of authentication mechanisms. Information is stored in association with the user account, where the information indicates the number of authentication mechanisms to be used for authentication in association with the user account and indicates the selected authentication mechanisms. At least a subset of the selected authentication mechanisms is used for authentication in association with the user account.

In another embodiment, a device comprising a processor and a memory is configured to perform one or more of the above described method operations. In another embodiment, a computer readable storage medium having computer program instructions stored thereon are arranged to perform one or more of the above described method operations.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Businesses often offer products or services via a web site for consumption by consumers. Generally, the consumers must have a user account to gain access to the products or services.

Typically, an individual may select a user password in association with a user identifier (e.g., username) at the time that a user account is established. In addition, the user password may be changed upon submission of a new user password to the system. For example, a user password may be submitted to the system in association with the user identifier via a graphical user interface.

To obtain access to the user account, a user may log in to the user account by submitting his or her user identifier and user password via a graphical user interface. Once logged in to the user account, the user may access information in the user account, access content or services via the web site, or receive various services such as personalized content from the system via various client devices. In many instances, the user account provides access to valuable personal information such as credit card numbers or the user's social security number.

Individuals often have multiple user accounts across a number of systems. For example, these systems may be associated with phone companies, banks, email systems, etc. As a result, the individuals have to keep track of the passwords associated with all of their user accounts. To make it easier to remember their passwords, individuals often re-use the same password across various systems.

Today, individuals have the ability to access their accounts from different locations. More particularly, most individuals own mobile devices such as tablets, laptops, or cellular phones, increasing the likelihood that they will access unsecured wireless networks. In addition, individuals may access their accounts from computing devices other than their own when they are not at home. For example, individuals might access their friends' computing devices or airport kiosks when they are traveling. Therefore, there are many opportunities for user information submitted during the login process to be compromised.

In the event that a hacker has intercepted or captured the username and password of a user during the login process, they may gain access to valuable personal information of the user via the corresponding user account. In addition, where the user has used the same password for other accounts, the security of his or her other accounts may also be comprised.

Some systems offer additional security by using a two-tier authentication operation. For example, once a user has submitted their user identifier and password, such systems may generate and provide a further code via email to be submitted by the user to successfully log in to their user account. While such systems may provide some additional security, the user still has to keep track of their password to successfully complete the log in process. Accordingly, there fails to be a secure mechanism that enables users to efficiently log in to their accounts that eliminates the need for users to remember their passwords for their accounts.

Systems using two-tier authentication operations typically perform a two-tier authentication process to authenticate all users under all circumstances. However, some users may desire greater security than that offered by such systems.

The disclosed embodiments support the customization of authentication operations that are applied to user accounts by account holders. Examples of systems and methods for implementing the disclosed embodiments will be described in further detail below.

When a user sets up his or her user account, they typically select a user identifier and password. However, in accordance with various embodiments, the user may configure their user account such that a desired number of authentication mechanisms will be used to perform authentication in association with the user account. Moreover, the user may select the authentication mechanism(s) that may be used to authenticate the user when the user subsequently logs in to the user account. While the authentication mechanisms the user selects may include a "traditional password," the authentication mechanisms need not include a password.

Example System

Figure 1:
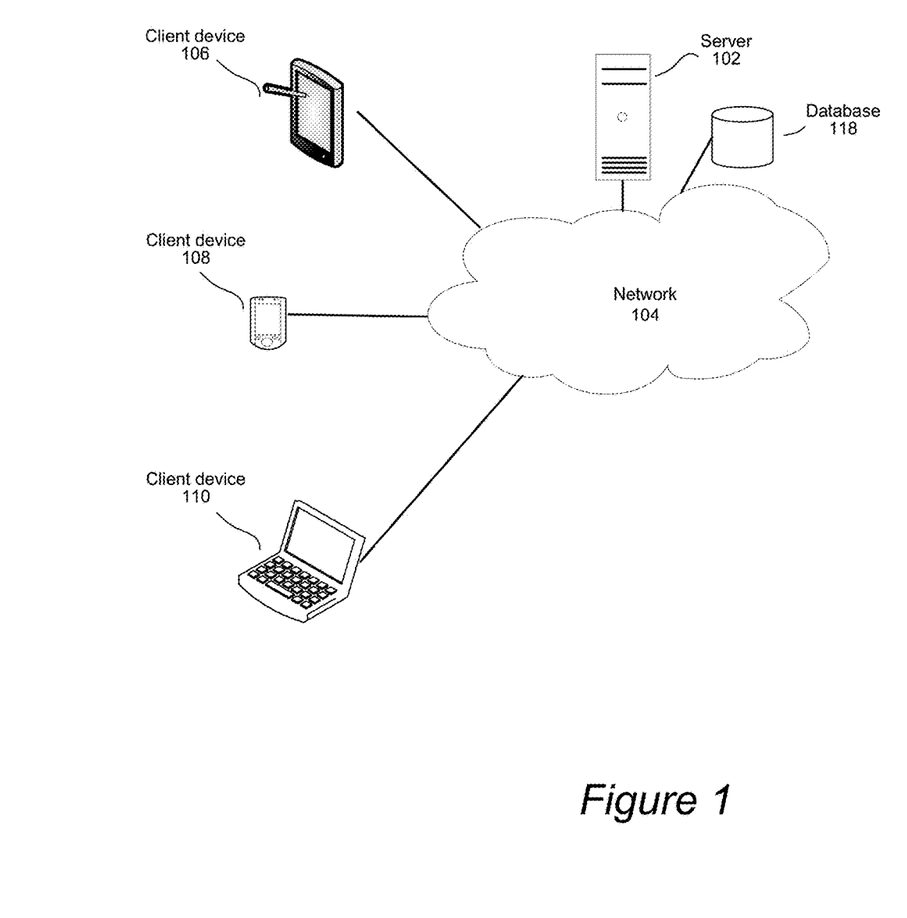
FIG. 1 is a diagram illustrating an example system in which various embodiments may be implemented.

FIG. 1 is a diagram illustrating an example system in which various embodiments may be implemented. As shown in FIG. 1, the system may include one or more servers 102. For example, the servers 102 may be associated with a web site that provides a variety of services to its users. More particularly, the server(s) 102 may include a web server, search server, and/or content server.

In accordance with various embodiments, the system supports user-customized authentication configurations for user accounts. A customized authentication configuration associated with a user account may indicate a number of authentication mechanisms that will be applied to authenticate the user account and/or may indicate specific authentication mechanisms that may be applied to the user account. Various methods of establishing customized authentication configurations for user accounts will be described in further detail below.

In some embodiments, the server(s) 102 may provide services such as targeted content to users of the web site. A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

As shown in FIG. 1, a plurality of clients 106, 108, 110 may log in to their user accounts via the web site to access their accounts, purchase products, or access/receive various services offered to account holders by the web site. In some embodiments, the services may include the transmission of personalized content to the clients 106, 108, 110. In other embodiments, the services may include email or other messaging services.

Services may be provided to the clients 106, 108, 110 via applications implemented by the servers 102 and/or the clients 106, 108, 110. The clients 106, 108, 110 may access a web service, for example, on a web server via network 104 using a graphical user interface. For example, the web service may offer users the ability to establish customized authentication configurations for user accounts. In some embodiments, the clients 106, 108, 110 may access a search application on a search server via network 104.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which various embodiments may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A system supporting various authentication customization services may be implemented on any number of servers although only a single server 102 is illustrated for clarity. Various embodiments disclosed herein may be implemented via the server 102 and/or the clients 106, 108, 110. For example, various features may be implemented via a web browser and/or application on the clients 106, 108, 110. The disclosed embodiments may be implemented via software and/or hardware.

Users that are members of the web site, access content or other services of the web site, or receive services such as personalized content from the web site may have user accounts that are maintained by the system. In accordance with various embodiments, the server(s) 102 may have access to one or more databases into which account information is retained for each of a plurality of user accounts. The databases may be retained in one or more memories 118 that are coupled to the server 102.

The account information pertaining to a user account may include a user identifier. The user identifier may uniquely identify an account owner (e.g., user) within the system. For example, the user identifier may include a sequence of alphanumeric characters such as a social security number, a phone number, a family name (e.g., Lovlesh Chhabra), a username (e.g., Lovlesh408), or an email address. In accordance with various embodiments, the user identifier is a username that corresponds to an email address associated with the user account. In other embodiments, the user identifier may be determined using other mechanisms.

In addition, the account information may include an authentication configuration for the corresponding user account. More particularly, the account information may specify or otherwise indicate the number of authentication mechanisms to be applied to authenticate a user of the user account. In addition, the account information may include information pertaining to authentication mechanism(s) that may be applied to authenticate the user of the user account. Specifically, the information may identify or otherwise indicate one or more authentication mechanisms that are to be applied to perform authentication in association with the user account or to be made available for authentication in association with the user account. The account information may also indicate context(s) in which the authentication configuration is to be applied. The account information may support multiple authentication configurations, which may be associated with corresponding contexts. As will be described in further detail below, the authentication mechanism(s) may be selected by the account owner from a plurality of authentication mechanisms supported by the system.

Example authentication mechanisms that may be supported by the system include, but are not limited to, passwords, Short Message Service (sms) verification, push notification, a FIDO device, biometrics, a back up code, a code generator, and/or a possession factor device such as a universal serial bus (USB) security token, near field communication (NFC) device, or smart card. Example biometric authentication methods include, but are not limited to, deoxyribonucleic acid (DNA), retina scan, finger print recognition, or facial recognition.

A back up code may be a code generated by the system and provided to the user. Typically, back up codes are designed for one-time use. A backup code may be pre-generated, enabling the user to obtain the code for use at a later time. The code may be provided via a mechanism such as sending or downloading the code to the user's client device, providing the code for display, or printing the code. The user may request a backup code by submitting a request to the system.

A code generator may also be implemented by the system. Typically, a code generator generates a code via a generator such as a random number generator. The code generator may generate the code automatically without receiving a request from the user or, alternatively, the code may be generated in response to receiving a request from the user. The code may be transmitted to a client device of the user. For example, the code may be sent via sms message to a mobile device of the user.

To perform sms verification, the system may transmit a sms message to a mobile phone number specified in the account information to confirm that the owner of the user account is in possession of the mobile device having the mobile phone number. Confirmation may be received by the system via a user action such as sending a reply sms message. In some embodiments, the sms message that is transmitted by the system includes a code to be entered by the user via a web page or other suitable mechanism. The user may subsequently verify receipt of the sms message by submitting the code.

Generally, a push notification initiates a notification transmitted by the system via an application installed on a client device (e.g., mobile device). Upon receipt of the notification, the user may interact with the application to confirm receipt of the notification. For example, the user may confirm receipt of the notification by interacting with a touch screen of their mobile device. In some embodiments, the user may tap a touch-screen of their mobile device to confirm receipt of the notification. In other embodiments, the user may interact with the touch-screen of their mobile device, resulting in the display of a web page including a graphical user interface. The user may then confirm receipt of the notification by clicking on a link in the web page.

An authentication configuration may indicate which authentication mechanisms have been selected by the user from a plurality of authentication mechanisms. The authentication configuration may also indicate the authentication mechanism(s) that are optional authentication mechanisms, which may be later selected by the system or the user for application during a particular login session. For example, during authentication configuration, the user may select "Y," "N," or "Maybe" for each of the plurality of authentication mechanisms.

For each of the plurality of authentication mechanisms, a value may be stored indicating whether the user wishes to have the corresponding authentication mechanism applied to authenticate the user during subsequent login attempts. In accordance with various embodiments, the values for the plurality of authentication mechanisms may be stored together as an authentication vector. For example, an authentication vector (1, 1, 1, 0, 0, 0, 0) may indicate that the user would like authentication for the user account to include a password, sms verification, and push notification.

Additional information may be stored in association with any of the authentication mechanisms configured for the user account. For example, the account information may include one or more passwords. As another example, the account information may include a mobile phone number via which sms verification may be implemented.

In accordance with various embodiments, the account information may also include device information pertaining to the client device(s) previously accessed in association with the user account. For example, the device information may include an IP address, MAC address, browser identifier, and/or geographic location from which the corresponding client device was accessed. The system may implement various authentication mechanisms (e.g., push notifications) using the device information. The account information may also indicate the number of times or frequency with which the devices or corresponding locations were accessed in association with the user account.

In some embodiments, the account information may further include personal information such as demographic information (e.g., birth date, age, occupation, and/or gender) and/or geographic information (e.g., residence address, work address, zip code, and/or area code). The account information may also include credit card information, enabling account owners to be charged for various products or services offered by the web site.

In addition, each time a user performs online activities such as logging in to the web site, performing a search, clicking on a web page or an advertisement, or purchasing goods or services, information regarding such activity or activities may be retained in user logs. For instance, the user data that is retained in the user logs may indicate the identity of web sites visited, identity of ads that have been selected (e.g., clicked on), client device information (e.g., browser identifier, IP address, and/or MAC address), geographic location of the client device, and/or a timestamp.

Authentication Configuration

Figure 2:
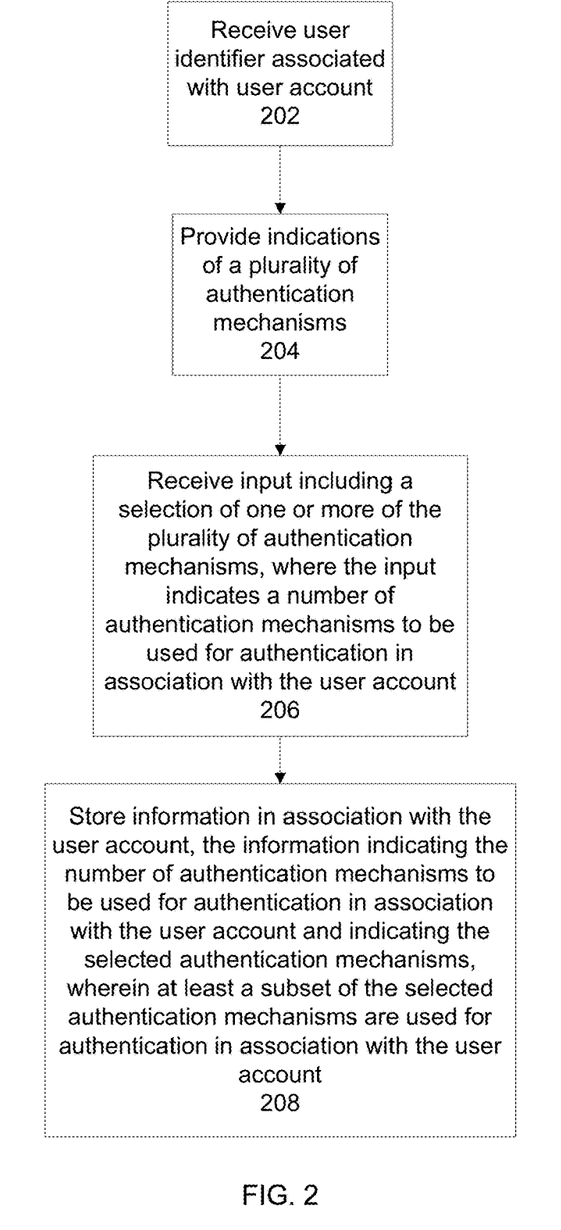
FIG. 2 is a process flow diagram illustrating an example method of configuring a user account to implement a customizable authentication mechanism in accordance with various embodiments.

FIG. 2 is a process flow diagram illustrating an example method of configuring a user account to implement a customizable authentication mechanism in accordance with various embodiments. The configuration may be performed at the time the user account is set up or after the user has logged in to an existing account.

At the time that a user account is set up or when the user logs into an existing user account, a user identifier associated with a user account may be received at 202 from a client device. To log into an existing user account, the user is authenticated via authentication mechanism(s) currently configured for the user account.

To set up a new user account or configure an existing user account, the user may select those authentication mechanisms that will be applied or made available to authenticate the user during subsequent logins. More particularly indications of a plurality of authentication mechanisms available for authentication may be provided for display via the client device at 204. For example, the authentication mechanisms may include, but are not limited to, a password, sms verification, push notification, a FIDO device, biometrics (e.g., fingerprint, facial recognition, and/or retina scan), pre-generated back up code(s), and/or a code generator.

Input including a selection of one or more of the plurality of authentication mechanisms from the client device may be received at 206, where the input indicates a number of authentication mechanisms to be used for authentication in association with the user account. The number of authentication mechanisms to be used for authentication in association with the user account may be implicit in the authentication mechanisms that have been selected. For example, where the user selects three different authentication mechanisms (e.g., sms verification, a password, and a push notification), it may be implicit that all three of the selected mechanisms are to be used for authentication in association with the user account. Alternatively, in some embodiments, the input may specify or otherwise indicate a specific number of authentication mechanisms to be used for authentication in association with the user account. In other words, authentication may be performed using a subset of the selected authentication mechanisms rather than all of the selected mechanisms, where the subset is either selected at a later time (e.g., during a subsequent login) by the system or by the user.

In some embodiments, the user may select two or more authentication mechanisms in association with the user account. In other words, in some instances, the system may prevent the user from selecting a single authentication mechanism. In other embodiments, the system may enable the user to select a single authentication mechanism or multiple authentication mechanisms.

In some embodiments, the user may select those authentication mechanism(s) that the system is to apply to authenticate the user during subsequent login attempts. In addition, the user may select those authentication mechanism(s) that may be optionally applied by the system. For example, for a particular authentication mechanism (e.g., password), the user may select "Y" to indicate that application of the authentication mechanism by the system is not optional, "MAYBE" to indicate that application of the authentication mechanism by the system is optional, or "N" to indicate the authentication mechanism is not to be applied by the system. Those authentication mechanisms that are optional may be subsequently selected by the system or the user (e.g., during a subsequent login).

Further information may be received or obtained in association with one or more of the selected authentication mechanisms. For example, where the user has selected the sms verification mechanism, the user may submit or select a telephone number to be used by the sms verification mechanism. As another example, where the user has elected to use a password, the user may submit, select, or otherwise indicate the password to be used for authentication.

In some embodiments, the user may indicate the order in which the user-specified authentication mechanisms are to be applied. In some instances, the order in which the authentication mechanisms are applied may facilitate ease of authentication by the user.

Information may be stored in association with the user account at 208, where the information indicates the number of authentication mechanisms to be used for authentication in association with the user account and indicates the selected authentication mechanism(s). The information may indicate those authentication mechanisms that are optional, as well as any additional related information (e.g., phone numbers, passwords, etc.). At least a subset of the selected authentication mechanisms may subsequently be used for authentication in association with the user account. As described above, where the user indicates that the number of authentication mechanisms to be used for authentication is less than the number of authentication mechanisms selected from the plurality of authentication mechanisms, the subset of the authentication mechanisms that are actually applied may be selected (e.g., by the system or the user) at the time that account access is desired or attempted by the user. Therefore, the subset of authentication mechanisms that are actually applied for authentication in association with the user account need not be statically configured.

Configuration of Number of Authentication Mechanisms

A user may wish to implement a greater number of authentication mechanisms when the user account is less secure. For example, the user may configure their user account to apply a greater number of authentication mechanisms while the user is traveling. When the user returns from traveling, the user may modify the configuration to reduce the number of authentication mechanisms.

Figure 3:
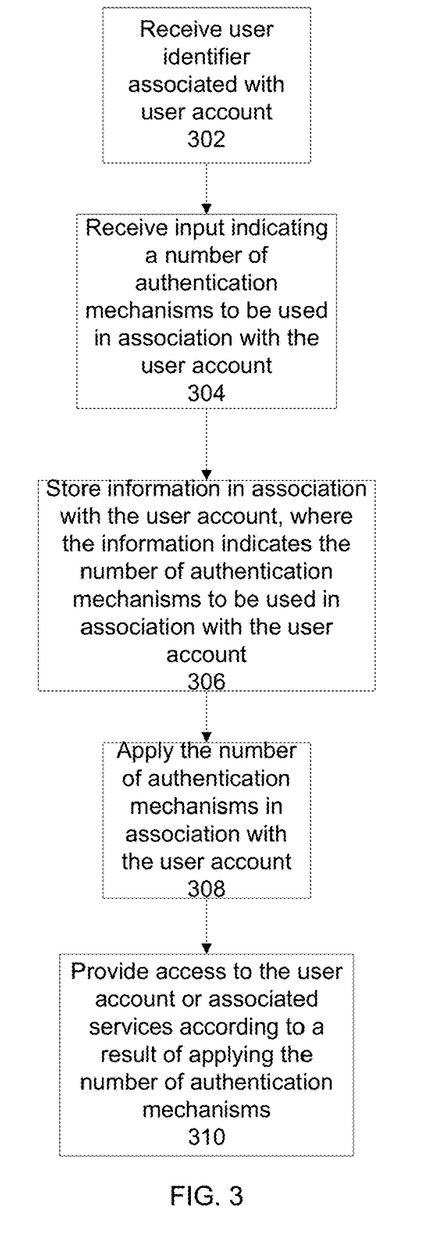
FIG. 3 is a process flow diagram illustrating an example method of configuring a user account to implement a user-configured number of authentication mechanisms in accordance with various embodiments.

In accordance with various embodiments, the number of authentication mechanisms may be configured independently from the selection of authentication mechanisms by the user. FIG. 3 is a process flow diagram illustrating an example method of configuring a user account to implement a particular number of authentication mechanisms in accordance with various embodiments. As described above, a user identifier associated with a user account may be received at 302 from a client device. To log into an existing user account, the user is authenticated via authentication mechanism(s) currently configured for the user account.

To set up a new user account or configure an existing user account, the user may specify, select, or otherwise indicate the number of authentication mechanisms that will be applied to authenticate the user during subsequent logins. More particularly, the system may receive, from the client device, input specifying, selecting, or otherwise indicating a number of authentication mechanisms to be used for authentication in association with the user account at 304. The system may store information in association with the user account at 306, where the information indicates the number of authentication mechanisms to be used for authentication in association with the user account.

During subsequent login attempts, upon receiving the user identifier for the user account, the system may apply the number of authentication mechanisms in association with the user account at 308. If the user has not previously selected authentication mechanisms to be applied, the system may select the authentication mechanisms to be applied from a plurality of authentication mechanisms. For example, the authentication mechanisms may be randomly selected, or may be selected based upon the current context (e.g., context of the user, a device of the user, or another device accessing the user account). The system may provide access to the user account or associated services at 310 according to a result of applying the number of authentication mechanisms.

In some embodiments, the number of authentication mechanisms that is applied may be automatically determined by the system based, at least in part, upon the current context. As will be described in further detail below, the user may configure their user account such that the user-configured number of authentication mechanisms is applied in particular context(s).

Providing Access using Customizable Authentication Mechanism

In accordance with various embodiments, account access may be achieved via a login process. Generally, a user may access his or her user account by accessing a login web page of a web site. For example, to initiate the login process, a user may submit their user identifier via a graphical user interface presented via a login page.

The user may indicate that they wish to access their user account by submitting their user identifier (e.g., via a login page). The system may then lookup the authentication configuration for the user account. The system may then apply one or more authentication mechanisms to authenticate the user according to the customized authentication configuration associated with the user account.

In some embodiments, the system may apply all of the previously user-selected authentication mechanisms. The system may then provide access to the user account according to a result of applying all of the selected authentication mechanisms. More particularly, if all of the selected authentication mechanisms successfully authenticate the user, access to the user account (or associated services) may be granted. However, if any of the selected authentication mechanisms fails to successfully authenticate the user, access to the user account may be denied.

In other embodiments, at the time that the user wishes to access the user account, a subset of the previously selected authentication mechanisms may be applied. In one embodiment, at the time that the user wishes to access their user account, the user has an opportunity to select a subset of the user-configured authentication mechanisms that will actually be applied. More particularly, where the user-configured authentication mechanisms include two or more authentication mechanisms, the system may provide indications of the user-configured authentication mechanisms. A selection of a subset of the user-configured authentication mechanisms may then be received via a graphical user interface. For example, where the user has previously indicated that a particular number of authentication mechanisms are to be applied in association with their user account, the user may select a subset of the user-configured authentication mechanisms such that the number of authentication mechanisms is selected. The selected subset of the user-configured authentication mechanisms may be applied, and access to the user account may be provided according to a result of applying the selected subset of the user-configured authentication mechanisms. More particularly, if any of the subset of the authentication mechanisms fails to successfully authenticate the user, access to the user account may be denied. Therefore, access to the user account may be granted if each of the authentication mechanisms in the selected subset successfully authenticate the user.

In another embodiment, the system may select a subset of the user-configured authentication mechanisms according to the number of authentication mechanisms previously configured by the user. Once the configured number of authentication mechanisms has been selected by the system from the previously configured authentication mechanisms, this selected subset of the authentication mechanisms may be applied. Access to the user account may be provided according to a result of applying the subset of the plurality of authentication mechanisms. Therefore, access to the user account may be granted or denied based upon whether authentication by each authentication mechanism in the subset of authentication mechanisms is successful.

Where the user has indicated an order in which the user-selected authentication mechanisms are to be applied, the authentication mechanisms may be applied in the indicated order. The order may be indicated by the user at the time of configuration. Alternatively, the order may be indicated at the time that the user selects a subset of previously selected authentication mechanisms.

If an authentication mechanism is applied and authentication fails, the system may re-apply the failed authentication mechanism to account for typographical errors. For example, where the user enters the incorrect password, the system may provide another opportunity for the user to enter the correct password. In some embodiments, upon failure of one authentication mechanism, the remaining authentication mechanisms need not be applied. In other embodiments, if authentication by one user-selected authentication mechanism fails, the system may apply a different user-selected authentication mechanism.

Typically, when the user has forgotten their user password, the system provides a secondary mechanism that enables the user to receive their user password or reset their password. However, by transmitting the user password via the user's electronic mail or text message, the security of the user account may be compromised. For example, other individuals who have access to the user's device may view or intercept the user password.

In accordance with various embodiments, the system enables the user to select those authentication mechanisms that are applied at the time of login. Thus, the user need not select the password option at the time of login. As a result, it would be unnecessary for the user to subsequently request their user password from the system. Accordingly, the security of the user account cannot be compromised as a result of a password request submitted by the user or another individual attempting to fraudulently access the user account.

In accordance with various embodiments, once a user has been authenticated according to the authentication configuration associated with the user account, access to the user account or associated services may be provided. For example, at least a portion of the account information associated with the user account may be modified. In addition, the system may provide a variety of services to the user. For example, personalized services, which may include content such as news articles or advertisements, may be provided to a client device via which the login process was completed.

Context-Based Authentication

As described above, the user may configure their user account by selecting those authentication mechanisms that can be used for authentication of the user account. In addition, the configuration may include an indication of the number of authentication mechanisms that will be used for authentication of the user account.

In some embodiments, authentication may also be context-based. More particularly, the configuration may indicate that the authentication mechanism(s) and/or the number of authentication mechanisms are to be applied under specific circumstances. Furthermore, a user account may be configurable such that multiple configurations may be established, enabling different authentication configurations to be applied in different sets of circumstances.

In accordance with various embodiments, the user may select, specify, or otherwise indicate the context(s) in which a particular authentication configuration is to be applied. More particularly, the user may indicate the context(s) in which the user-selected authentication mechanisms are to be applied or made available for authentication in association with the user account. Upon receiving an indication of the contexts, the system may store, in association with the user account, information indicating the contexts in which the selected authentication mechanisms are to be applied or made available for authentication in association with the user account. At least a subset of the selected authentication mechanisms may subsequently be applied for authentication in association with the user account in the indicated contexts. For example, where the user has also specified a particular number of authentication mechanisms during configuration, the number of the selected authentication mechanisms may be applied at the time of a subsequent login.

When the user subsequently indicates that they would like to access the user account by submitting their user identifier (e.g., via a login page), the system may apply the user-selected mechanisms or a subset thereof based upon the current context. More particularly, upon receiving the user identifier associated with the user account, the system may look up the authentication configuration for the user account. Since the authentication configuration is context-based, the system may ascertain the current context. The system may identify the user-configured authentication mechanisms for the user account that correspond to the current context. In some embodiments, the system may look up the authentication configuration that applies to the user account (e.g., user identifier) for the current context. Upon determining that the current context is a context in which the configured authentication mechanisms are to be applied or made available for authentication in association with the user account, the system may apply at least a portion of the configured authentication mechanisms, as described above. Access to the user account may be provided according to a result of applying the previously configured authentication mechanisms or portion thereof. For example, where the user has also specified a desired number of authentication mechanisms, the number of authentication mechanisms may be selected from the previously configured authentication mechanisms. Access to the user account may be provided upon determining that authentication by the selected authentication mechanism(s) (or portion thereof) is successful.

Similarly, in some embodiments, the user may configure the user account such that the number of authentication mechanisms that are applied varies according to the current context. The user need not select specific authentication mechanisms to be applied. More particularly, the user may want their user account to be authenticated with a greater number of authentication mechanisms in contexts that are less secure. For example, the user may wish to have two authentication mechanisms applied during authentication when the user is in the U.S., and four authentication mechanisms applied during authentication when the user is outside the U.S.

In some embodiments, the user may select, specify, or otherwise indicate the contexts in which a particular number of authentication mechanisms are to be used for authentication in association with the user account. Upon receiving an indication of the contexts, the system may store, in association with the user account, information indicating the contexts in which the configured number of authentication mechanisms is to be used for authentication in association with the user account.

When the user subsequently indicates that they would like to access the user account by submitting their user identifier, the system may look up the authentication configuration for the user account. In addition, the system may ascertain the current context. Based upon the authentication configuration for the user account, the system may then determine the appropriate number of authentication mechanisms to apply under the current context. In some embodiments, the system may look up the authentication configuration that applies to the user account (e.g., user identifier) for the current context.

The system may determine that the current context is a context in which the number of authentication mechanisms is to be applied for authentication in association with the user account. The system may then apply the user-configured number of authentication mechanisms based upon the current context. In some embodiments, where the authentication mechanisms have not been configured by the user, authentication mechanisms may be selected by the system. In other embodiments, where authentication mechanisms have been configured by the user, at least a portion of the user-selected authentication mechanisms may be applied such that the configured number of authentication mechanisms is used for authentication in association with the user account. More particularly, the system or the user may select the number of authentication mechanisms from the user-configured authentication mechanisms, which may correspond to the current context. Access to the user account may be provided according to a result of applying the number of the selected authentication mechanisms. Accordingly, access to the user account may be provided upon determining that authentication by the number of authentication mechanisms is successful.

The current context may include a present context of the user, a present context of a client device of the user, and/or a present context of a device via which access to the user account is being attempted. For example, the current context may include a geographic location, an Internet Protocol (IP) address, and/or a MAC address. The geographic location of a device may be ascertained, for example, via an IP address of the device requesting access or a Global Positioning System (GPS) of the device. The geographic location of the user may be ascertained via a device of the user, a calendar or electronic mail program of the user, a profile of the user, or information submitted by the user to the authentication system. For example, the user may indicate in their electronic mail program that they will be out of the office during a particular period of time. As another example, the user may submit information via the authentication system that informs the system that the user will be in Germany during a specific period of time.

In accordance with various embodiments, an authentication configuration may be established via one or more rules configured by the user. Rules may be configured via a graphical user interface, enabling the user to associate a set of authentication mechanisms and/or a particular number of authentication mechanisms with a particular context or set of contexts.

The disclosed embodiments may be implemented in a variety of network environments. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel between devices may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

In some embodiments, authentication may be facilitated in a distributed system. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Authentication may also be facilitated in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

In addition, a wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
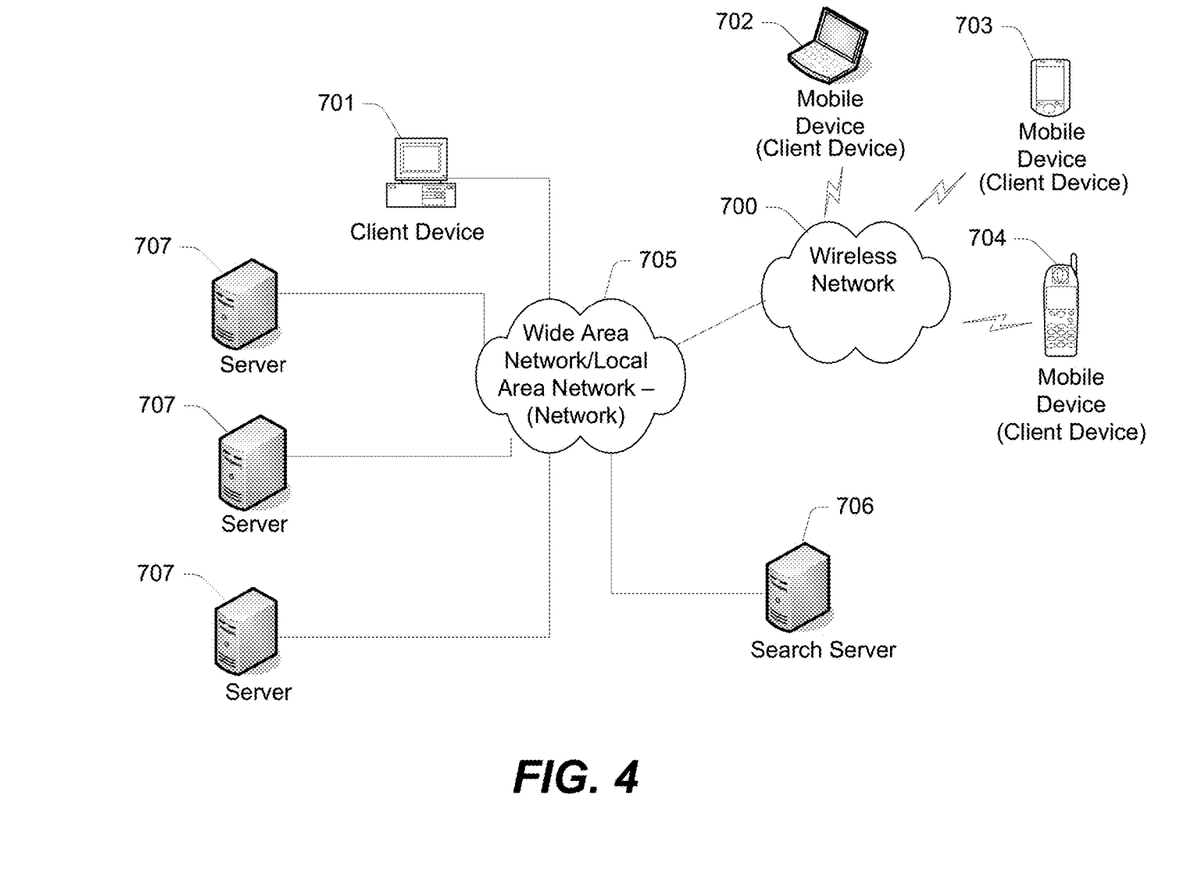
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 4 by server(s) 707, which may correspond to multiple distributed devices and data store(s). The server(s) 707 and/or corresponding data store(s) may store user account data, user information, and/or content.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 5:
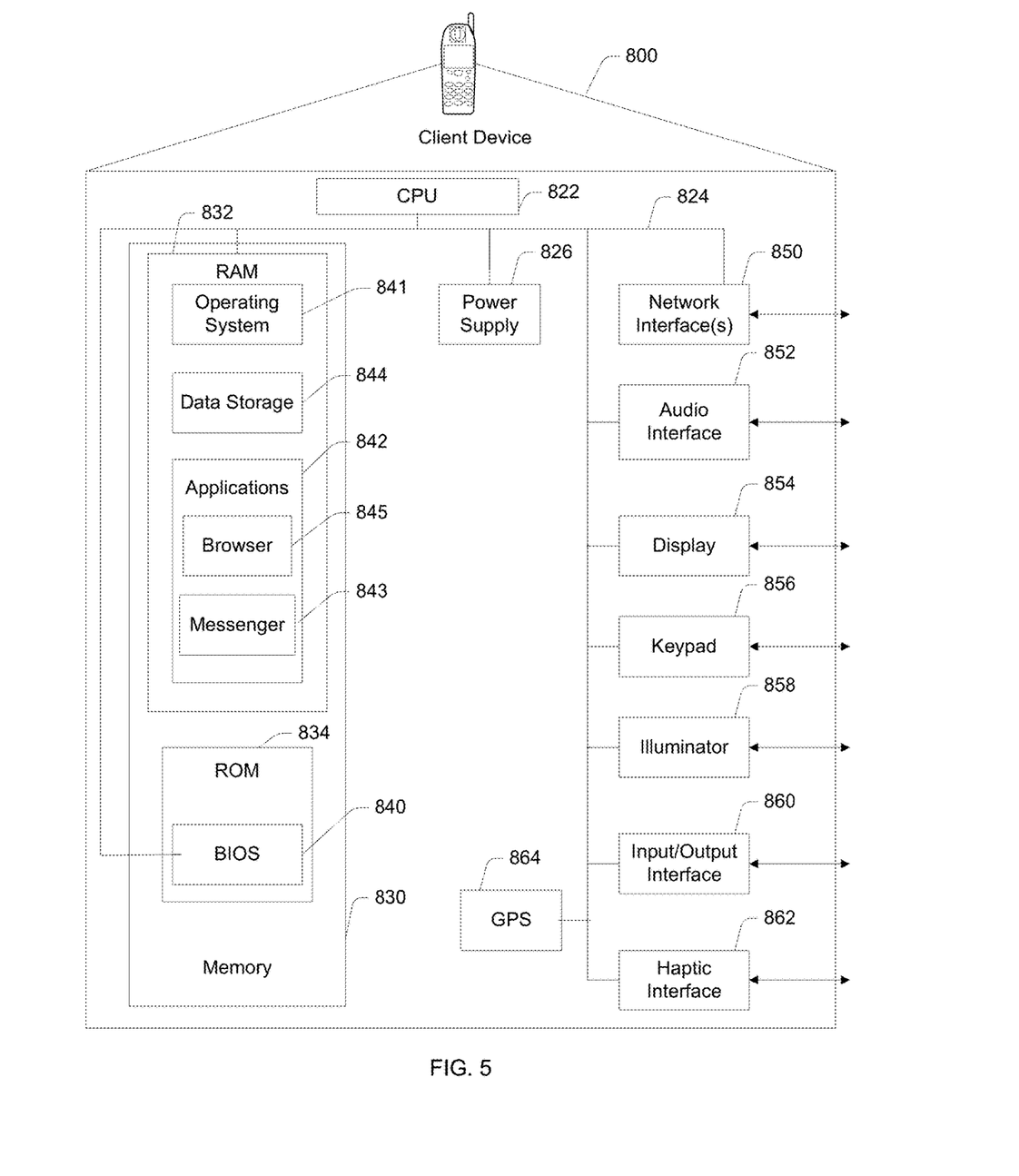
FIG. 5 is a schematic diagram illustrating an example client device in which various embodiments may be implemented.

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 6:
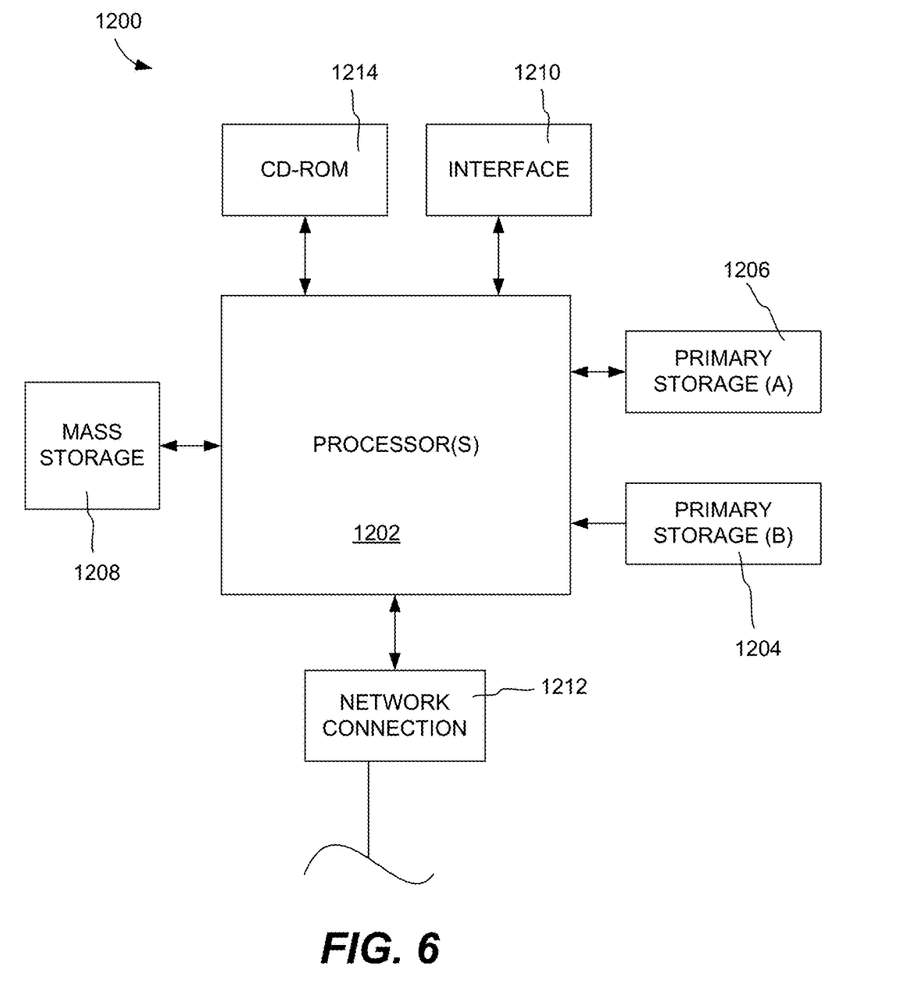
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may include a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the embodiments are not to be limited to the details given herein, but may be modified within the scope and equivalents of the appended claims.

What is claimed is:

1. A method, comprising:
receiving, by one or more servers from a client device, a user identifier associated with a user account;
providing, by the one or more servers for display via the client device, indications of a plurality of authentication mechanisms available for authentication;
receiving, by the one or more servers from the client device, input including both a selection of one or more of the plurality of authentication mechanisms and an indication of a particular number of authentication mechanisms to be used for authentication in association with the user account;
storing, by the one or more servers, information in association with the user account, the information indicating the particular number of authentication mechanisms to be used for authentication in association with the user account and indicating the selected one or more of the plurality of authentication mechanisms; and
applying at least a subset of the selected one or more of the plurality of authentication mechanisms for authentication in association with the user account, the subset of the selected one or more of the plurality of authentication mechanisms including the particular number of authentication mechanisms;
wherein the input does not indicate the subset of the selected one or more of the plurality of authentication mechanisms that is applied for authentication in association with the user account.

2. The method as recited in claim 1, wherein the one or more of the plurality of authentication mechanisms comprises two or more of the plurality of authentication mechanisms, the method further comprising:
providing indications of the two or more of the plurality of authentication mechanisms for display by a client device;
receiving an indication of a selection of a subset of the two or more of the plurality of authentication mechanisms from the client device such that the selected subset of the two or more of the plurality of authentication mechanisms includes the particular number of authentication mechanisms;
applying the selected subset of the two or more of the plurality of authentication mechanisms; and
providing access to the user account or associated services according to a result of applying the selected subset of the two or more of the plurality of authentication mechanisms.

3. The method as recited in claim 1, wherein the one or more of the plurality of authentication mechanisms comprises two or more of the plurality of authentication mechanisms, the method further comprising:
selecting, by a processor, a subset of the two or more of the plurality of authentication mechanisms such that the selected subset of the two or more of the plurality of authentication mechanisms includes the particular number of authentication mechanisms;
applying the subset of the plurality of authentication mechanisms; and
providing access to the user account or associated services according to a result of applying the subset of the plurality of authentication mechanisms.

4. The method as recited in claim 1, further comprising:
applying the subset of the selected one or more of the plurality of authentication mechanisms; and
providing access to the user account or associated services according to a result of applying the subset of the selected one or more of the plurality of authentication mechanisms.

5. The method as recited in claim 1, further comprising:
receiving an indication of contexts in which the selected one or more of the plurality of authentication mechanisms are to be applied or made available for authentication in association with the user account;
storing, in association with the user account, information indicating the contexts in which the selected one or more of the plurality of mechanisms are to be applied or made available for authentication in association with the user account; and
selecting at least a subset of the selected one or more of the plurality of authentication mechanisms for authentication in association with the user account in the contexts that are indicated according to a current context and according to the particular number of authentication mechanisms.

6. The method as recited in claim 1, further comprising:
ascertaining a current context;
determining that the current context is a context in which the selected one or more of the plurality of authentication mechanisms are to be applied or made available for authentication in association with the user account;
applying at least a portion of the selected one or more of the plurality of authentication mechanisms according to the particular number of authentication mechanisms; and
providing access to the user account or associated services according to a result of applying the at least a portion of the selected one or more of the plurality of authentication mechanisms.

7. The method as recited in claim 1, further comprising:
receiving an indication of contexts in which the particular number of authentication mechanisms are to be used for authentication in association with the user account; and
storing, in association with the user account, an indication of the contexts in which the particular number of authentication mechanisms are to be used for authentication in association with the user account.

8. The method as recited in claim 1, further comprising:
ascertaining a current context;
determining that the current context is a context in which the particular number of authentication mechanisms are to be applied for authentication in association with the user account;
selecting at least a portion of the selected one or more of the plurality of authentication mechanisms according to the particular number of authentication mechanisms;
applying the at least a portion of the selected authentication mechanisms; and
providing access to the user account or associated services according to a result of applying the at least a portion of the selected authentication mechanisms.

9. An apparatus, comprising:
a processor; and
a memory, at least one of the processor or the memory being configured to:
receive, via a network from a client device, a user identifier associated with a user account;
receive, via the network from the client device, input indicating a particular quantity of authentication mechanisms to be used for authentication in association with the user account;

store information in association with the user account, the information indicating the particular quantity of authentication mechanisms to be used for authentication in association with the user account;

select one or more authentication mechanisms from a plurality of authentication mechanisms according to the particular quantity of authentication mechanisms;

apply the one or more authentication mechanisms in association with the user account; and provide access to the user account or associated services according to a result of applying the one or more authentication mechanisms;

wherein the input does not indicate the one or more authentication mechanisms that are applied in association with the user account.

10. The apparatus as recited in claim 9, at least one of the processor or the memory being configured to:

receive an indication of contexts in which the particular number of authentication mechanisms are to be used for authentication in association with the user account; and store, in association with the user account, an indication of the contexts in which the particular number of authentication mechanisms are to be used for authentication in association with the user account;

wherein selecting one or more authentication mechanisms from a plurality of authentication mechanisms according to the particular quantity of authentication mechanisms is performed based upon the indicated contexts and a current context.

11. The apparatus as recited in claim 9, at least one of the processor or the memory being further configured to:

ascertain a current context;

determine that the current context is a context in which the particular number of authentication mechanisms are to be applied for authentication in association with the user account.

12. The apparatus as recited in claim 11, wherein ascertaining a current context comprises:

ascertaining a geographic location of the client device or an account holder of the user account.

13. A non-transitory computer-readable storage medium method, comprising:

instructions for providing via a network, for display via the client device, indications of a plurality of authentication mechanisms available for authentication;

instructions for obtaining via the network, from the client device, input indicating a particular quantity of authentication mechanisms to be used for authentication in association with a user account and including a selection of one or more of the plurality of authentication mechanisms;

instructions for storing information in association with the user account, the information indicating the particular quantity of authentication mechanisms to be used for authentication in association with the user account and indicating the selected one or more of the plurality of authentication mechanisms; and instructions for applying at least a subset of the selected one or more of the plurality of authentication mechanisms for authentication in association with the user account, the subset of the selected one or more of the plurality of authentication mechanisms including the particular quantity of authentication mechanisms;

wherein the input does not indicate the subset of the selected one or more of the plurality of authentication mechanisms that is applied for authentication in association with the user account.

14. The non-transitory computer-readable storage medium as recited in claim 13, wherein the one or more of the plurality of authentication mechanisms comprises two or more of the plurality of authentication mechanisms, further comprising:

instructions for providing indications of the two or more of the plurality of authentication mechanisms for display by a client device;

instructions for obtaining a selection of a subset of the two or more of the plurality of authentication mechanisms from the client device such that the selected subset of the two or more of the plurality of authentication mechanism includes the particular quantity of authentication mechanisms;

instructions for applying the selected subset of the two or more of the plurality of authentication mechanisms; and instructions for providing access to the user account or associated services according to a result of applying the selected subset of the two or more of the plurality of authentication mechanisms.

15. The non-transitory computer-readable storage medium as recited in claim 13, wherein the one or more of the plurality of authentication mechanisms comprises two or more of the plurality of authentication mechanisms, further comprising:

instructions for selecting, by a processor, a subset of the two or more of the plurality of authentication mechanisms such that the subset of the two or more of the plurality of authentication mechanism includes the particular quantity of authentication mechanisms has been selected;

instructions for applying the subset of the plurality of authentication mechanisms; and instructions for providing access to the user account or associated services according to a result of applying the subset of the plurality of authentication mechanisms.

16. The non-transitory computer-readable storage medium as recited in claim 13, further comprising:

instructions for applying the subset of the selected one or more of the plurality of authentication mechanisms; and instructions for providing access to the user account or associated services according to a result of applying the subset of the selected one or more of the plurality of authentication mechanisms.

17. The non-transitory computer-readable storage medium as recited in claim 13, further comprising:

instructions for obtaining an indication of contexts in which the selected one or more of the plurality of authentication mechanisms are to be applied or made available for authentication in association with the user account;

instructions for storing, in association with the user account, information indicating the contexts in which the selected one or more of the plurality of mechanisms are to be applied or made available for authentication in association with the user account; and instructions for selecting at least a subset of the selected one or more of the plurality of authentication mechanisms for authentication in association with the user account in the contexts that are indicated according to a current context and according to the particular quantity of authentication mechanisms.

18. The non-transitory computer-readable storage medium as recited in claim 13, further comprising:
instructions for ascertaining a current context;
instructions for determining that the current context is a context in which the selected one or more of the plurality of authentication mechanisms are to be applied or made available for authentication in association with the user account;
instructions for applying at least a portion of the selected one or more of the plurality of authentication mechanisms according to the particular quantity of authentication mechanisms; and
instructions for providing access to the user account or associated services according to a result of applying the at least a portion of the selected one or more of the plurality of authentication mechanisms.

19. The non-transitory computer-readable storage medium as recited in claim 13, further comprising:
instructions for obtaining indication of contexts in which the particular quantity of authentication mechanisms are to be used for authentication in association with the user account; and
instructions for storing, in association with the user account, an indication of the contexts in which the particular quantity of authentication mechanisms are to be used for authentication in association with the user account.

20. The non-transitory computer-readable storage medium as recited in claim 13, further comprising:
instructions for ascertaining a current context;
instructions for determining that the current context is a context in which the particular number of authentication mechanisms are to be applied for authentication in association with the user account;
instructions for selecting at least a portion of the selected one or more of the plurality of authentication mechanisms according to the particular quantity of authentication mechanisms;
instructions for applying the at least a portion of the selected authentication mechanisms; and
instructions for providing access to the user account or associated services according to a result of applying the at least a portion of the selected authentication mechanisms.

21. The method as recited in claim 1, wherein the input is received via a graphical user interface.

22. The method as recited in claim 1, wherein the input is user input.

23. The method as recited in claim 1, wherein the input indicates a numerical value, the numerical value indicating the particular number of authentication mechanisms to be used for authentication in association with the user account.

24. The method as recited in claim 23, wherein the input specifies the numerical value.

25. The method as recited in claim 1, wherein the input does not specify the subset of the selected one or more of the plurality of authentication mechanisms that are to be used for authentication in association with the user account.

26. The apparatus as recited in claim 9, wherein the input does not indicate the plurality of authentication mechanisms from which the one or more authentication mechanisms are selected.

* * * * *